United States Patent
Haddad et al.

(10) Patent No.: US 9,118,699 B2
(45) Date of Patent: Aug. 25, 2015

(54) COMMUNICATIONS METHODS AND APPARATUS FOR USE IN COMMUNICATING WITH COMMUNICATIONS PEERS

(75) Inventors: Wassim Michel Haddad, West New York, NJ (US); M. Scott Corson, Gillette, NJ (US); Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 12/359,534

(22) Filed: Jan. 26, 2009

(65) Prior Publication Data

US 2010/0191964 A1    Jul. 29, 2010

(51) Int. Cl.
*H04L 9/32*    (2006.01)
*H04L 29/06*    (2006.01)

(52) U.S. Cl.
CPC ....................................... *H04L 63/12* (2013.01)

(58) Field of Classification Search
CPC ........ H04L 63/08; H04L 63/0428; H04L 9/08
USPC .......................................................... 713/168
See application file for complete search history.

(56) References Cited

U.S. PATENT DOCUMENTS

| | | | |
|---|---|---|---|
| 2002/0023216 A1 | 2/2002 | Noguchi et al. | |
| 2003/0233551 A1* | 12/2003 | Kouznetsov et al. | 713/175 |
| 2004/0088369 A1* | 5/2004 | Yeager et al. | 709/217 |
| 2005/0086300 A1* | 4/2005 | Yeager et al. | 709/204 |
| 2006/0277092 A1* | 12/2006 | Williams | 705/10 |
| 2007/0260879 A1* | 11/2007 | Dzung | 713/163 |
| 2008/0137856 A1* | 6/2008 | Ja Beom et al. | 380/255 |
| 2008/0155215 A1 | 6/2008 | Matsuzaki et al. | |
| 2010/0057876 A1 | 3/2010 | Yu | |
| 2010/0074315 A1 | 3/2010 | Hahn | |
| 2010/0313246 A1* | 12/2010 | Irvine et al. | 726/4 |

FOREIGN PATENT DOCUMENTS

| | | |
|---|---|---|
| CN | 101149748 A | 3/2008 |
| JP | 2002026899 A | 1/2002 |

(Continued)

OTHER PUBLICATIONS

Perich et al., "In Reputation We Believe: Query Processing in Mobile Ad-hoc Networks," Aug. 2004, International Conference on Mobile and Ubiquitous System: Networking and Service, pp. 1-8.*

(Continued)

*Primary Examiner* — Ali Abyaneh
(74) *Attorney, Agent, or Firm* — James K. O'Hare

(57) ABSTRACT

Methods and apparatus related to the determination of the trustworthiness of information communicated in a message and/or the exchange of trust information are described. Various described methods and apparatus are well suited to peer to peer wireless communications in an ad-hoc network. At a given time, a communications device may have a trust relationship with a first set of devices. A first communications device determines trustworthiness of a received message from a second device, which is not a member of the first set of devices, based on information received from a third device which is a member of the first set of devices. The first communications device makes an informed decision as to whether or not to act upon the first message based upon its trustworthiness determination.

32 Claims, 12 Drawing Sheets

(56) References Cited

FOREIGN PATENT DOCUMENTS

| JP | 2003323343 A | 11/2003 |
| JP | 2008312048 A | 12/2008 |
| JP | 2010530700 A | 9/2010 |
| WO | WO 03081840 A1 * | 10/2003 |
| WO | WO2004107137 | 12/2004 |
| WO | 2006077977 A1 | 7/2006 |
| WO | WO-2008156266 A1 | 12/2008 |

OTHER PUBLICATIONS

Abdul et al., "A Distributed Trust Model," University of London, 1997, pp. 1-13.*

Cornelli F., et al., "Choosing reputable servents in a P2P network, XP040134825 Honolulu, Hawaii, USA DOI: http://doi.acm.org/10.1145/511446.511496 ISBN: 1-58113-449-5 abstract figures 2,3 sections 3,4,6," Proceedings of the 11th International Conference on World Wide Web Conference, 2002, 376-386.

International Search Report and Written Opinion—PCT/US2010/022134, International Search Authority—European Patent Office—Aug. 3, 2010.

Kim M J et al: "Service Discovery Using Volunteer Nodes in Heterogeneous Pervasive Computing Environments," Pervasive and Mobile Computing, Elsevier, NL, vol. 2, No. 3, Sep. 1, 2006, pp. 313-343.

Partial International Search Report—PCT/US2010/022134—International Search Authority—European Patent Office, Apr. 9, 2010.

Singh A.,et al., "TrustMe: anonymous management of trust relationships in decentralized P2P systems," Piscataway, 2003, 142-149.

Sung E.,et al., "Service Discovery and Delivery System Based on Trust in Mobile Ad-Hoc Network," Information Science and Security, 2008.

European Search Report—EPEP14190458—Search Authority—Munich—Feb. 17, 2015.

* cited by examiner

COMMUNICATIONS METHODS AND APPARATUS FOR USE IN COMMUNICATING WITH COMMUNICATIONS PEERS

FIELD

Various embodiments relate to wireless communications methods and apparatus and, more particularly, to wireless communications methods and apparatus for communicating information and building trust between various communications devices, e.g., nodes, which support peer to peer signaling.

BACKGROUND

Wireless communications are increasingly gaining acceptance and are being increasingly relied upon as a convenient medium to communicate many types of information, in addition to being used for voice calls. One area experiencing rapid growth is the field of ad hoc networks utilizing peer to peer communications. In an ad hoc and geographically limited environment, it would be desirable for a user to be able to transmit different types of messages, e.g., advertisements, requests, news, etc., to each of the other users located within the range of his/her device. However, a receiving user, who has never dealt with the sender before, may have no way to determine whether or not the sender can be trusted and whether or not it is worthwhile to spend time to reply to the sender's message. Note that such lack of trust among users is independent from being able to validate the signature carried by the message. In fact, a malicious user can sign and transmit, e.g., multicast, a message, and the receivers may be able to validate the signature, but this does not mean that the sender is sincere about his/her intention. Consequently, a user acting upon a received message from an untrustworthy or malicious user may end up as a victim. A similar trust problem occurs from the sender's perspective with regard to response from users whom the sender does not already know.

Based on the above discussion, it would be advantageous if new methods and/or apparatus could be developed that allow wireless devices to gather and/or exchange trust related information. New methods and apparatus that facilitate a trustworthiness determination of information communicated in a message would also be beneficial.

SUMMARY

Methods and apparatus related to the determination of the trustworthiness of information communicated in a message and/or the exchange of trust information are described. Various described methods and apparatus are well suited to peer to peer wireless communications in an ad-hoc network.

Some methods and apparatus relate to a communications device determining trustworthiness of a received message. For example, in an ad hoc peer to peer communications network, at a given time, a first communications node may have a trust relationship with a first set of nodes. Different communications nodes in the network may have trust relationships with different sets of nodes. There may be, and typically is, at least some overlap between at least some of the different sets of nodes. In accordance with a feature of some embodiments, this overlap is utilized to propagate trust information. In some embodiments, the first communications device may receive a message from a second communications device which is not a member of the first set of nodes. The first communications device may also receive trust related information from one of the members of the first set of nodes in a second message. The first communications device determines the trustworthiness of the information communicated in the first message based on the received trust related information from the second message. The first communications device makes an informed decision as to whether or not to act upon the first message based upon its trustworthiness determination.

An exemplary method of operating a first communications node, in accordance with one exemplary embodiment, comprises receiving a first message from a second communications node, said first message communicating information, receiving a second message from a third communications node with which there is a trust relationship, and determining the trustworthiness of the information communicated by the first message based on information communicated by the second message. An exemplary first communications node, implemented in accordance with one exemplary embodiment, comprises at least one processor configured to receive a first message from a second communications node, said first message communicating information, receive a second message from a third communications node with which there is a trust relationship, and determine the trustworthiness of the information communicated by the first message based on information communicated by the second message. The first communications node may, and in some embodiments does, include a memory coupled to said at least one processor.

Some methods and apparatus relate to the propagation of trust information in a wireless communications network, e.g., a peer to peer ad hoc wireless communications network. Some embodiments include the generation and transmission of a novel trust propagation message. In some embodiments, a novel trust confirmation request message is used.

An exemplary method of operating a first communications node, in accordance with some embodiments, comprises receiving a first message from a second communications node with which there is a trust relationship, the first message including message source verification information and a message identifier identifying a second message sent from the second communications node, and transmitting a third message to a third communications node with which there is a trust relationship, the third message including message source verification information and said message identifier. An exemplary first communications node implemented in accordance with an exemplary embodiment comprises at least one processor configured to receive a first message from a second communications node with which there is a trust relationship, the first message including message source verification information and a message identifier identifying a second message sent from the second communications node, and transmit a third message to a third communications node with which there is a trust relationship, the third message including message source verification information and said message identifier. The first communications node may, and in some embodiments does, include a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
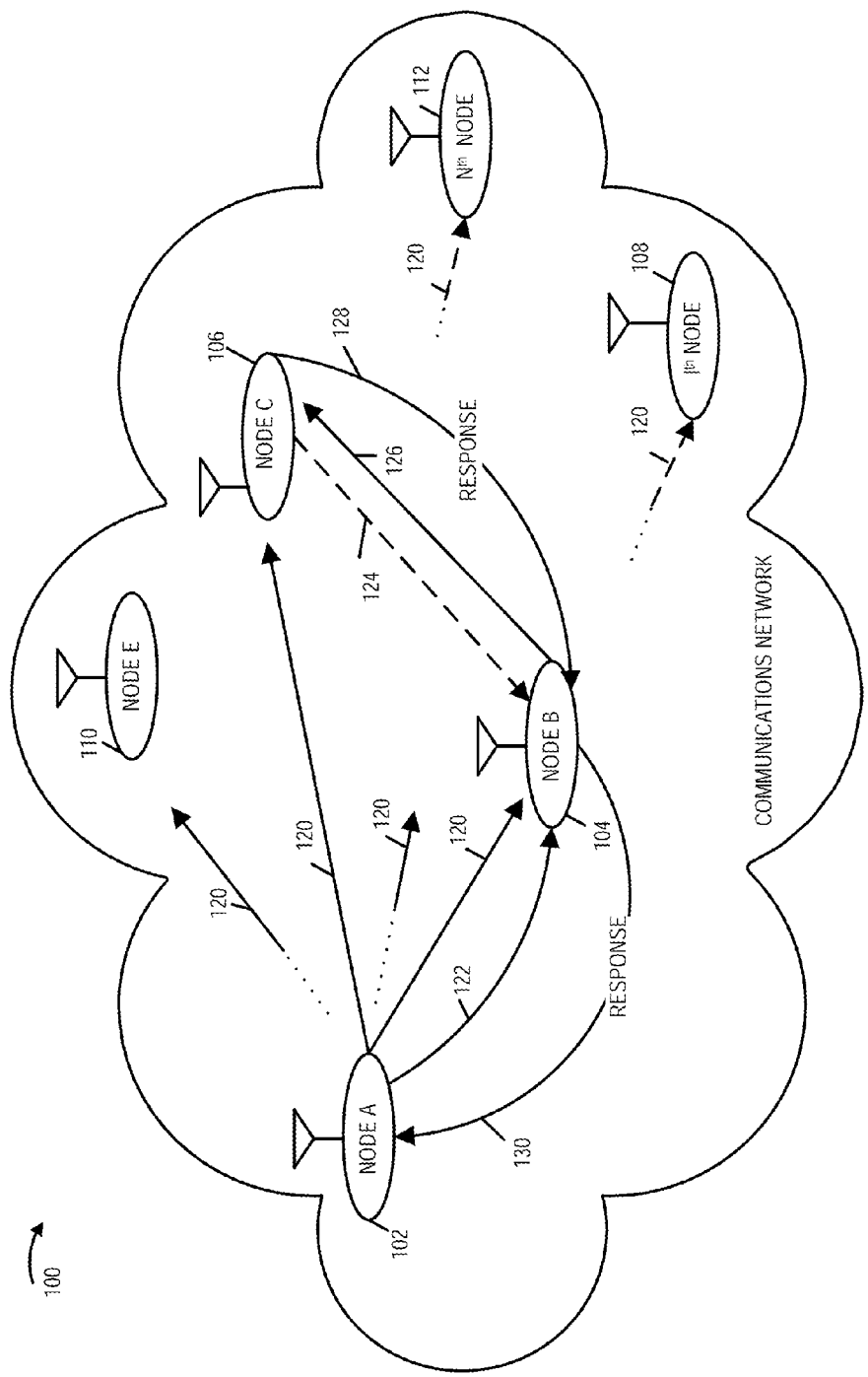
FIG. 1 illustrates an exemplary communications network, in accordance with an exemplary embodiment.

FIG. 1 is a drawing of an exemplary communications network 100, e.g., an ad-hoc peer to peer wireless communications network, implemented in accordance with one exemplary embodiment. Exemplary communications network 100 includes a plurality of communication nodes (communication node A 102, communication node B 104, communication node C 106, $I^{th}$ communication node 108, node E 110, and . . . , $N^{th}$ communication node 112) which support wireless communications, e.g., peer to peer wireless communications. Although few communications nodes have been shown in the communications network 100, it should be appreciated that the density of communication nodes in the network 100 may, and sometimes does, vary. The wireless communications nodes (102, 104, 106, 108, 110, . . . , 112) support various signaling between peers, e.g., peer discovery signals, transmission request signals, advertisement messages, etc. Wireless communications nodes (102, 104, 106, 108, 110, . . . , 112) may be, e.g., handheld battery powered devices.

In accordance with one scenario of one exemplary embodiment, communication node A 102 transmits, e.g., multicasts, a message 120 to a number of communications nodes which may be located in a local geographic region covered by the communications network 100. In one exemplary variation, message 120 is transmitted multiple times by node A 102 in accordance with a predetermined schedule for a given period of time, e.g., the transmission of message 120 is periodic for the given period of time. As shown in FIG. 1 message 120 may be received by a plurality of communication nodes, e.g., node B 104, node C 106, $I^{th}$ communication node 108, node E 110, and $N^{th}$ communication node 112. The message 120, in some embodiments include, at least one of a service offer, service request, advertisement, and media content. As an example consider a scenario in which the user of communications node A 102 is offering to one or more other network 100 users, a car ride from a first location, location X, to another location, location Y. For example, location X is Somerset, N.J. and location Y is Manhattan, N.Y. Thus in this example, we can refer to message 120 as a service offer message. Although message 120 may carry sending node A's signature it should be appreciated that the sending node A 102 may not disclose its true or complete identity in the message 120. In accordance with one aspect, some of the communication nodes, e.g., node B 104, may have a trust relationship with node A 102, and node B 104 may be included in a buddy list of node A 102. The buddy list of node A 102 includes, e.g., information identifying and/or pertaining to one or more communication nodes that have an existing trust relationship with node A 102. The trust relationship may exist, for example because one of nodes A 102 and node B 104 may have used a service offered by the other one of node A 102 and node B 104 at some earlier point in time and at least one of node A 102 and node B 104 has concluded that the other one of node A 102 and node B 104 is trustworthy.

In one exemplary scenario in one exemplary embodiment, communications node A 102 and communications node B 104 have a trust relationship, and communications node B 104 and communications node C 106 have a trust relationship. Further consider that communications node A 102 and communications node C 106 do not have a trust relationship. Further consider that a user of a communications node, e.g., a user of node C 106, who may have not dealt with the user of node A 102 previously, may be interested in the offered service, e.g., ride offered by the user of node A 102. In accordance with one aspect, communications node C 106 may wish to determine whether or not the node A 102, which is offering the service, is trustworthy and/or may wish to determine validity with regard to message 120. In other words, since a trust relationship does not exist between node A 102 and node C 106, node C 106 may wish to find out the reputation of node A 102 and validity of message 120 from node A 102. It should be appreciated that this can be a genuine concern from the perspective of the user of node C 106, since it is possible that some malicious user may advertise a false service offer, e.g., a car ride, and later may not show up at the indicated pick-up location. Thus, in such a case involving a malicious user sending the service offer message, node C 106 may end up wasting time at the pick-up location. In accordance with one aspect, some users, e.g., user of node B 104, who is aware of the credibility of node A 102 may help to propagate trust to other nodes so that the nodes which are interested in the service offered by node A 102, may know that the sender of message 120 is genuine and trustworthy. In some embodiments, there may be a number of such nodes present in the network 100 which have previously dealt with node A 102, and based on their past experiences with node A 102, one or more of these nodes can help propagate trust.

In addition to the transmission of message signal 120, various other signaling may occur in the network 100. For example, in one exemplary embodiment in one exemplary scenario, node A 102 also communicates a message 122, e.g., a trust build-up message, to one or more nodes in its buddy list with which there is a trust relationship, e.g., node B 104. In some embodiments, message 122 includes message source verification information, e.g., a unique identifier, identifying message 120 sent from node A 102. It should be appreciated that one of the motives behind sending message 122, e.g., the trust build-up message, is to engage the maximum number of trusted buddies, e.g., users trusted by node A 102, to contribute in routing node A's credibility/trustworthiness within their own contacts and/or their own trusted buddies, e.g., if they are queried about node A 102's trustworthiness. Another motive behind sending message 122 from node A 102 to its trusted buddies is to enable these trusted buddies to validate message 120 since node A 102 may not disclose its true identity in the message 120. In accordance with one aspect, following the receipt of message 122, node B 104 may start propagating trust among node B's trusted peers, validating the fact that the sender of message 120, i.e., node A 102, and/or the message 120, are trustworthy. In some embodiments, the trust propagation from node B 104 may be done by sending another message 126, e.g., a trust propagation message, from node B 102 to its trusted peers, e.g., node C 106. In some embodiments, node B 104 may transmit message 126 in response to a request message 124, e.g., a trust confirmation request message, from a trusted peer, e.g., node C 106. For example, node C 106 which has a trust relationship with node B 104, might be interested in the service offered by node A 102 and sends request message 124 to its trusted peers in its buddy list which includes node B 104, to seek their opinion about node A 102. In some such embodiments, node B 104 responds to the request message 124 by sending message 126. In some embodiments, the request message 124 includes the message identifier identifying message 120 and at least one of a sender signature or message authentication code. In some such embodiments, the message identifier is a unique identifier identifying message 120 sent from node A 102.

In accordance with one aspect, once node C 106 determines that the sender of message 120, e.g., user of node A 102 offering the ride is trustworthy, node C 106 may communicate a response, e.g., response message 128, in response to message 120. Such a response message may serve as a signal from node C 106 indicating node C's interest in the service offered by node A 102. In some, but not necessarily all, embodiments the response message 128 is not sent directly from node C 106 to node A 102. Rather response message 128 is communicated from node C 106 to node B 104 with which node C 106 has a trust relationship. Following the receipt of response message 128 from node C 106, node B 104 communicates another response message 130 to node A 102. Response message 130, in some embodiments, includes at least a portion of response message 128 and security information corresponding to node B 104. Response message 130, in some embodiments, includes response message 128 and security information corresponding to node B 104. It should be appreciated that since response message 130 is sent by node B 104, which is trusted by node A 102, node A 102 will be able to determine that response message 130 and its contents can be trusted. In this manner, node A 102 may determine that node C 106 is genuinely interested in using the service offered by node A 102.

Figure 2:
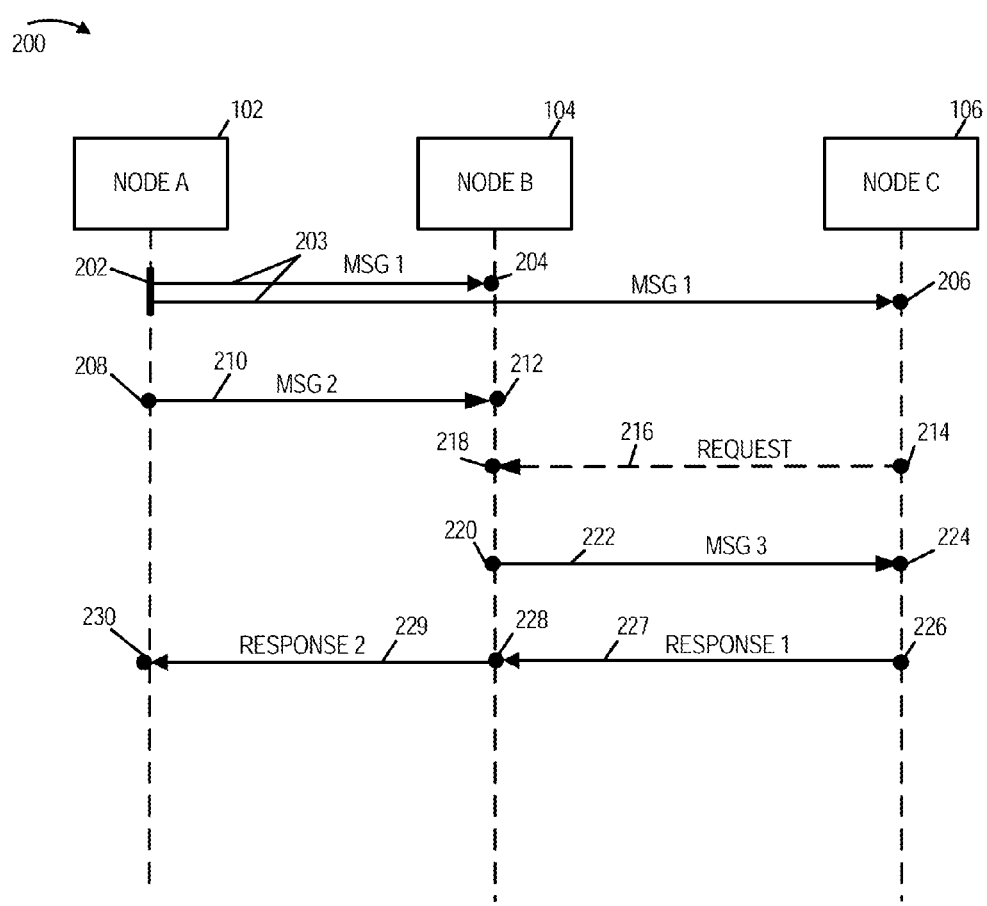
FIG. 2 illustrates exemplary signaling exchanges between communication nodes and steps associated with an exemplary method that supports communicating messages, e.g., service offers, and/or advertisements, in accordance with one exemplary embodiment.

FIG. 2 is a drawing 200 illustrating the steps and associated signaling used in one exemplary embodiment where a communication node, e.g., node A 102, transmits, e.g., multicasts, message MSG 1 203, e.g., a service offer message, which is received by communications node B 104 and communications node C 106. Although message MSG 1 203 is described as conveying a service offer in this example, it should be appreciated that message 203 may, in some embodiments does, include, e.g., one or more of: a service request, advertisement, media content, etc. For the purpose of this example consider that communications node A 102 has a trust relationship with communications node B 104, and communications node C 106 has a trust relationship with communications node B 104. Further consider that node A 102 does not have a pre-existing trust relationship with node C 106. Continuing with the example, consider that communications node C 106 is interested in the offered service indicated in message 203, which is being offered by node A 102. In this particular example the process is initiated by node A 102, which wishes to offer a service, for example, a car ride from location X to location Y. In step 202 node A 102 transmits, e.g., multicasts, MSG 1 203, e.g., the service offer message, to one or more nodes in a geographic area including nodes B 104 and C 106. Message MSG 1 203 is received and processed by node B 104 and node C 106 in steps 204 and 206 respectively.

In step 208 node A 102 sends message MSG 2 210, e.g., a trust build-up message, to node B 104. In some embodiments, message MSG 2 210 is sent to additional nodes in node A's buddy list with which node A 102 has a trust relationship. In some embodiments MSG 2 210, includes message source verification information, e.g., a unique identifier, identifying message MSG 1 203, which was sent from node A 102. It should be appreciated that such information may be included in message MSG 2 210, so that the trusted buddy node B 104 can validate message MSG 1 203. In step 212, message MSG 2 210 is received and processed by the second node B 104. Message MSG 2 210 may, for example, include a request from node A 102 to its trusted peers such as node B 104 that receive the message 210, to propagate the credibility information/trustworthiness of node A 102, to other members in the area which may be interested in offered service but are not aware of the trustworthiness of node A 102. Thus, node B 104 which has a trust relationship with node A 102 and is aware of node A's reputation, can help node A 102. For example node B 104 can propagate a good word about node A 102 among other members in the network, e.g., members such as node C 106, which have a trust relationship with node B 104 but not with node A 102.

In step 214 node C 106, which is interested in the offered service indicated in message MSG 1 203, may optionally send a request 216, e.g., a trust confirmation request message, to one or more of its trusted peers, following the receipt of message MSG 1 203. Request message 216 may be a request to node C's trusted peers to confirm if the sender of message MSG 1 203 and the contents of the message MSG 1 203 can be trusted. In some embodiments there is a reasonable probability that in a geographic area, one or more nodes which are trusted by node C 106 may be aware of the reputation of node A 102, e.g., due to a past dealing with node A 102. In the example of FIG. 2, node B 104 is one such node that has a trust relationship with both nodes A 102 and C 106. In step 218 node B 104 receives request message 216. In step 220, node B 104 starts propagating trust among node B's trusted peers, e.g., that the sender of the message MSG 1 203, i.e., node A 102, and/or the message MSG 1 203 contents, are trustworthy. Node B 104 does this by sending MSG 3 222, e.g., a trust propagation message, to its trusted peers. In the embodiments where node B 104 receives the request message 216 from node C 106, MSG 3 222 is sent in response to the request message 216.

The message MSG 3 222 is received by node C 106 in step 224, and is subject to further processing to determine the trustworthiness of the information communicated by message MSG 1 203, based on the information communicated by message MSG 3 222. In some embodiments message MSG 3 222 includes source verification information, e.g., signature of the sender, message authentication code (MAC), and information for verifying that the information communicated by message MSG 1 203 has not been altered. It should be appreciated that source verification information such as sender (node B 104) signature may help the receiver node C 106 to verify the authenticity of message MSG 3 222 and thus ensure that message MSG 3 222 is coming from a trusted source. In some embodiments message MSG 3 222 also includes a rating level indicator indicating, e.g., different possible rating levels. For example, the rating level indicator may indicate one of a trustworthiness rating, a service cost rating, a quality rating. In some embodiments, the higher the trustworthiness ratings the more the peer offering the service can be trusted. A quality rating, for example, may indicate the quality of service provided, e.g., in the example of car ride, a high quality rating may indicate how prompt the sender of the message will pick-up or for example the comfort level of the car, etc. In step 226, following the receipt of MSG 3 222 from entrusted peer node B 104 and after determining that the information communicated by the message MSG 1 203 is trustworthy, node C 106 sends a response to node A 102 through node B 104 which has trust relationship with node A 102. The response being sent from node C 106 is in response to message MSG 1 203, e.g., the service offer message, received from node A 102 earlier. The response may be, for example, an indication and/or an acknowledgment that node C 106 is interested in using the service offered by node A 102 and would like to interact directly with node A 102. Node C 106 sends a response message Response 1 227 to node B 104 which receives the response message Response 1 227 in step 228. In step 228 node B 104 generates a response message Response 2 229, in some embodiments, by modifying the received message 227 to include, e.g., some security information corresponding to node B 104. The response message Response 2 229, which includes the information communicated from node C 106 in response message Response 1 227, is then communicated to node A 102 from node B 104. Response message Response 2 229 is received by node A 102 in step 230 and node A 102 can trust the response message Response 2 229 since it is sent from the trusted node B 104. After receiving the response from node C 106, both node A 102 and C 106 may start negotiating with each other directly. When the trust relationship is established between node A 102 and node C 106, then the nodes A 102 and C 106 may start pairing and exchange certificates, e.g., spectrum use authorization documents, their IP address, public keys etc.

Figure 3:
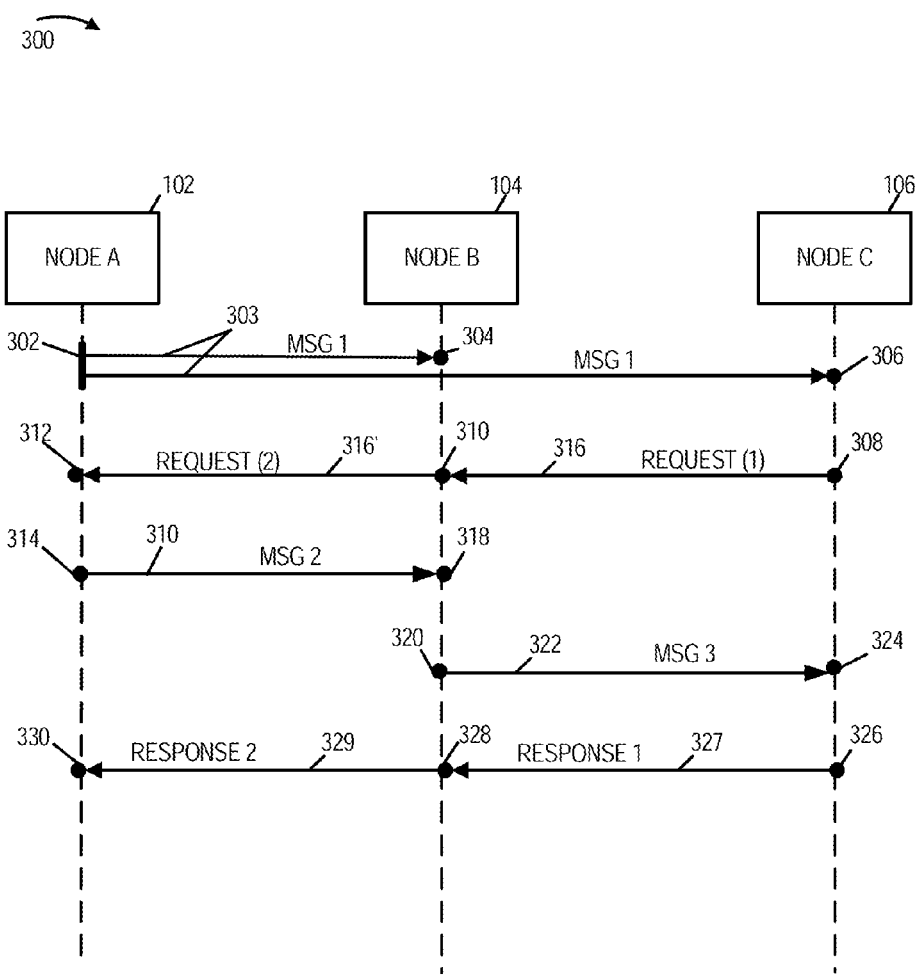
FIG. 3 illustrates exemplary signaling exchanges between communication nodes and steps associated with an exemplary method that supports communicating messages, e.g., service offers, and/or advertisements, in accordance with another exemplary embodiment.

FIG. 3 is a drawing 300 illustrating the steps and associated signaling used in another exemplary embodiment where a communication node A 102 transmits, e.g., multicasts, message MSG 1 303, e.g., a service offer message. In the example of FIG. 3, consider that node A 102 has a trust relationship with node B 104, node C 106 has a trust relationship with node B 104, and node A 102 does not have a pre-existing trust relationship with node C 106. Further consider that node C 106 is interested in a service offered indicated in message MSG 1 303, offered by node A 102. In step 302 node A 102 transmits, e.g., multicasts, MSG 1 303 to nodes B 104 and C 106. The message MSG 1 303 is received and processed by node B 104 and node C 106 in steps 304 and 306 respectively. Communications node C 106, being interested in the service offered by node A 102, sends a request (1) message 316, e.g., a trust confirmation request message, to the trusted nodes in its buddy list, e.g., node B 104. The request (1) message signal 316 is similar to the request message 216 discussed in the example of FIG. 2 and thus will not be discussed in detail again. In step 310 node B 104 receives and processes the request (1) message 316. Node B 104 generates a request (2) message 316', e.g., a trust confirmation request message, using the information included in the request (1) message 316. Node B 104 then sends the request (2) message 316' to node A 102 that sent message MSG 1 303. In some embodiments node B 104 may simply relay the received request (1) message to node A 102 rather than generating and sending request (2) message 316'.

In step 312 node A 102 receives the request (2) message 316', i.e., the trust confirmation request message. Following the receipt of, and in response to the request message (2) 316', in step 314 node A 102 sends MSG 2 310, e.g., a trust build-up message, to node B 104. It should be appreciated that an interesting difference in the embodiment presented in FIG. 3 from that of FIG. 2 is that in the embodiment of FIG. 3 message MSG 2 310, e.g., the trust build-up message, is sent from node A 102 if some other node, e.g., node C 106 in this case, shows interest in the offered service, whereas in the embodiment of FIG. 2 message MSG 2 210, e.g., the trust build-up message, is sent without requiring the reception of a signaling indicating a show of interest. Thus the approach of FIG. 3 can reduce the use of airlink resources. For example, in the example of FIG. 3 in the event that a request confirmation message is not detected by node A 102, message 2 310 is not transmitted. MSG 2 310 of FIG. 3 is the same or similar to the MSG 2 210 of FIG. 2, and the information that MSG 2 310 may communicate is similar or the same as with MSG 2 210 which has been discussed in detail in the FIG. 2 example. In step 318 node B 104 receives message MSG 2 310 and using the information included in the message MSG 2 310 validates message MSG 1 303. In step 320, node B 104 sends MSG 3 322, i.e., a trust propagation message, to node C 106, in response to the request (1) message 316 that node B 104 received earlier. The message MSG 3 322 is the same or similar to MSG 3 222 which has been discussed in detail earlier in the FIG. 2 example and thus the details will not be repeated. It should be appreciated that message MSG 3 322 in this example is sent to the node sending the request message (1) 316 and not to multiple trusted nodes which may not be even interested in service offered by node A 102. This is done in order to avoid unnecessary broadcast of MSG 3 322 message 322 and wastage of airlink resources. In some embodiments, the transmission power level of message MSG 3 322 can be lower than it would otherwise be if the MSG 3 322 message were being directed to multiple trusted nodes.

Message MSG 3 322 is received by node C 106 in step 324, and is subject to further processing to determine the trustworthiness of the information communicated in MSG 1 303, e.g., the service offer message, based on the information communicated by the message MSG 3 322. In some embodiments message MSG 3 322 includes source verification information, e.g., signature of the sender, message authentication code (MAC), and information for verifying that the information communicated by the MSG 1 303 has not been altered. In step 326, following the receipt of message MSG 3 322 from trusted peer node B 104 and after determining that the information communicated by message MSG 1 303 is trustworthy, node C 106 sends a response to node A 102 through node B 104 which has a trust relationship with node A 102. The response being sent from node C 106 is in response to message MSG 1 303 received from node A 102 earlier. Node C 106 sends a response 1 message 327 to node B 104 which receives the response 1 message 327 in step 328. Further in step 328 node B 104 generates a response 2 message 329, in some embodiments, by modifying the received response 1 message 327 to include, e.g., some security information corresponding to node B 104. The response 2 message 329, which includes the information communicated from node C 106 in response 1 message 327, is then communicated to node A 102 from node B 104. Response 2 message 329 is received by node A 102 in step 330 and since it is being sent by the trusted node B 104, node A 102 can trust the response 2 message 329.

Figure 4:
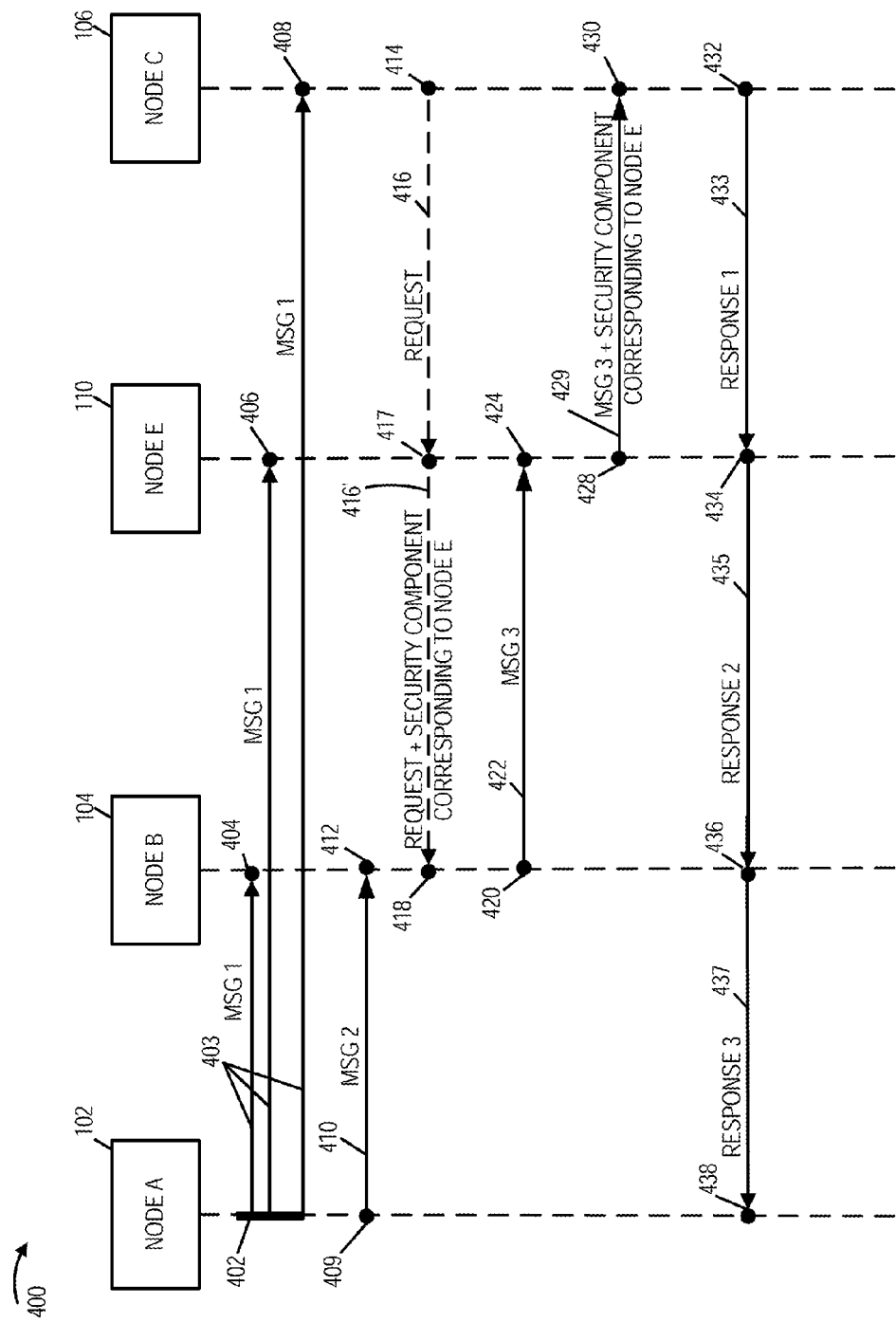
FIG. 4 illustrates exemplary signaling exchanges between communication nodes and steps associated with an exemplary method that supports communicating messages, e.g., service offers, and/or advertisements, in accordance with yet another exemplary embodiment.

FIG. 4 is a drawing 400 illustrating steps and associated signaling used in yet another exemplary embodiment where communication node A 102 transmits, e.g., multicasts, MSG 1 403, e.g., a service offer message as shown. In the exemplary embodiment shown in FIG. 4, consider that node A 102 has a trust relationship with node B 104, node B 104 has a trust relationship with node E 110, and node C 106 has a trust relationship with node E 110. However node A 102 does not have a pre-existing trust relationship with node C 106, and node B 104 does not have a pre-existing trust relationship with node C 106. Also, consider that node C 106 is interested in a service offer indicated by MSG 1 403, offered by node A 102. Thus, in the example discussed in FIG. 4 there may be no common node that has a trust relationship with both the service offering node A 102 and node C 106 which is interested in the offered service.

In step 402 node A 102 transmits, e.g., multicasts, MSG 1 403, e.g., a service offer message, to nodes B 104, E 110 and C 106. Message MSG 1 403 is received and processed by node B 102, node E 110 and node C 106 in steps 404, 406 and 408 respectively. In step 409 node A 102 sends a message MSG 2 410, e.g., a trust build-up message, to the trusted node B 104. MSG 2 410 includes information, e.g., a unique identifier, identifying message MSG 1 403 sent from node A 102, so that the trusted buddy node B 104 can validate message MSG 1 403. In step 412, message MSG 2 410 is received and processed by the second node B 104. On the other hand, node C 106 being interested in the service offered by node A 102, seeks to gather credibility information about the sender of message MSG 1 403. Thus, in step 414 node C 106 sends a request message 416, e.g., trust confirmation request message, to the trusted nodes in its buddy list, e.g., node E 110. Request message 416 may be sent from node C 106 to one or more of its trusted nodes to gather credibility about node A 102 that sent message MSG 1 403, e.g., to determine if the sending node and the contents of the message MSG 1 403 can be trusted. Request message 416 is received and processed by node E 110 in step 417. It should be noted that in this example, node E 110 does not have a trust relationship with node A 102 and may not have enough credibility information about node A 102 to determine trustworthiness of node A 102. Also, since node E 110 does not receive MSG 2 410, e.g., the trust build-up message, at this point node E 110 does not have the information to validate message MSG 1 403. Thus, in order to help its trusted buddy node C 106, in step 417 node E 110 sends another request message 416' that includes the information included in request message 416 along with security information corresponding to node E 110, to one or more of its trusted buddies such as node B 104 in this case. The security information, e.g., sender signature, is included by the communications node E 110 in the message 416' so that communications node B 104 that receives the message 416' may know that the request is being made by a trusted buddy. In some embodiments, node B 104 may not respond to trust confirmation requests made by non-trusted nodes. Message 416' is received and processed by node B 104 in step 418.

In step 420 node B 104 sends MSG 3 422, e.g., a trust propagation message, to node C 106, in response to the request message 417. Message MSG 3 422 of the example of FIG. 4 is the same as or similar to message MSG 3 222 of FIG. 2 or message MSG 3 322 of FIG. 3 which have been discussed in detail earlier and thus will not be discussed in detail again to avoid repetition. Message MSG 3 422 is sent to the node E 110 that sent the request message 416' and not to multiple trusted nodes which may not be even interested in service offered by node A 102. Message MSG 3 422 is received by node E 110 in step 424. In step 428, the received message MSG 3 422 is forwarded by node E 110 to node C 106 as message 429. Message 429 includes the information included in MSG 3 422 along with security information corresponding to node E 110, so that node C 106 may know that the message 429 is being sent by its trusted buddy in response to request message 416. In step 430, message 429 is received by node C 106 and is subject to further processing to determine the trustworthiness of the information communicated earlier by message MSG 1 403, based on the information communicated by the message 429. In step 432, following the receipt of the message 429 from trusted peer node E 110 and after determining that the information communicated by message MSG 1 403 is trustworthy, node C 106 sends a response message in response to message MSG 1 403 received earlier, to node A 102 through node E 110 and node B 104. Although the response may be communicated in multiple hops to node A 102, it should be appreciated that in this manner the response is routed from one trusted node to another trusted node and thus node A 102 which finally receives the response can trust the authenticity and integrity of the sent response. In step 432 response 1 433 is sent from node C 106 to the trusted buddy node E 110 which receives the response 1 433 in step 434. Further in step 434 node E 110 generates another message, response 2 435, which in some embodiments is generated by modifying the received response 1 433 to include, e.g., some security information corresponding to node E 110. The response 2 435, which includes the response communicated from node C 106, is then communicated by node E 110 to its trusted buddy node B 104. In step 436, node B 104 receives and processes the response 2 435 to include some security information corresponding to node B 104. The response message including security information corresponding to node B 104 is then communicated in step 436, as response 3 437 to node A 102. It should be appreciated that response 3 437 includes the information communicated by the response 1 433 from node C 106, although routed through different trusted nodes. Response 3 437 is received by node A 102 in step 438 and since it is being sent by the trusted node B 104, node A 102 can trust the response.

Figure 5:
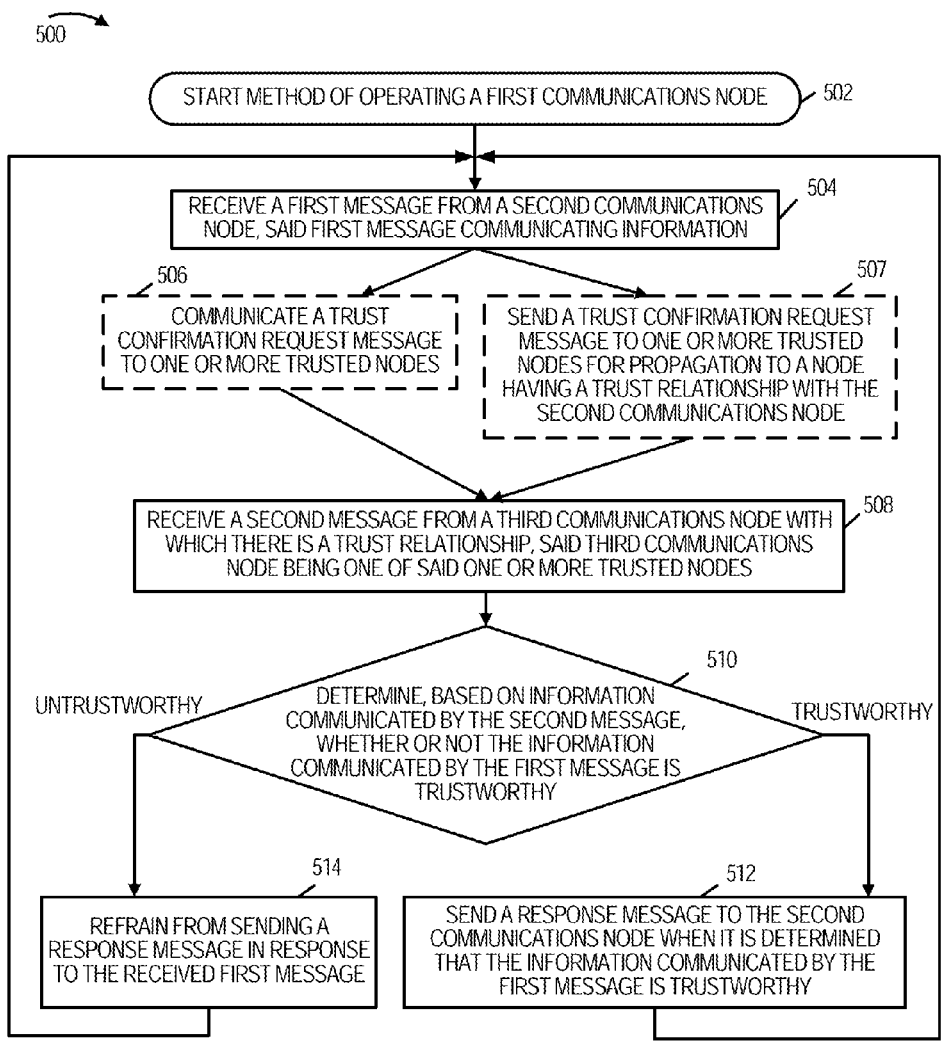
FIG. 5 is a flowchart of an exemplary method of operating a first communications node in accordance with one exemplary embodiment.

FIG. 5 is a flowchart 500 of an exemplary method of operating a first communications node, e.g., peer to peer communications node C 106 of FIG. 1, in accordance with an exemplary embodiment. Operation of the exemplary method starts in step 502 where the first communications node is powered on and initialized. Operation proceeds from start step 502 to step 504.

In step 504 the first communications node receives a first message, e.g., a service offer message, from a second communications node, e.g., node A 102, said first message communicating information. In the embodiment discussed in flowchart 500, the first communications node does not have a pre-existing trust relationship with the second communications node. The first message includes at least one of a service offer, service request, advertisement and media content. For the example discussed in flowchart 500 consider that the first message includes a service offer, e.g., an offer for a car ride from location X to location Y. The sender of the first message, i.e., the second communications node may, for example, transmit, e.g., multicast, the first message to a plurality of nodes in a geographic region, e.g., such as the one covered by network 100 of FIG. 1. In some embodiments the first message includes location information. In some such embodiments the location information is global positioning system (GPS) based location information. For example, the location information in the first message may be the location of an area from where the second communications node sending the first message would like to pick-up other users interested in the ride. In some embodiments, the operation proceeds from step 504 to step 506. In some embodiments the operation proceeds from step 504 to 507. It should be appreciated that both steps 506 and 507 are optional and one or more of steps 506 and 507 may be skipped.

In the optional step 506, following the receipt of the first message the first node communicates a trust confirmation request message to one or more of its trusted nodes, e.g., to communications node B 104. The first communications node may have a list of trusted nodes to which it may communicate one or more messages such as a trust confirmation request message during the operation. The trust confirmation request message may be sent to one or more trusted nodes, so that first communications node can gather information, e.g., credibility or trustworthiness information about the second node. Operation proceeds from step 506 to step 508.

In step 507 which may be performed in some embodiments, the first node sends the trust confirmation request message to one or more trusted nodes for propagation to a node having a trust relationship with the second node. This may be done in some embodiments, for example where the first communications node and the second communications node do not have a common trusted buddy. Thus, in such a case, the trust confirmation request message may be propagated from the first node to its trusted buddy, e.g., which further propagates the message to the trusted members in its own buddy list and so on. In this manner the trust confirmation request message is propagated to a node having a trust relationship with the second node. The operation proceeds from step 507 to step 508.

In step 508, the first communications node receives a second message, e.g., trust propagation message, from a third communications node with which there is a trust relationship, the third communications node being one of the one or more nodes trusted by the first communications node. In some embodiments the third communications node has a trust relationship with the first node. In some embodiments, the first communications node receives the second message, e.g., the trust propagation message in response to the trust confirmation request communicated to the trusted third communications node (e.g., communicated in step 506 earlier). In some embodiments the third node is within one of a predetermined range of the location indicated in the first message or within a range, indicated in the first message, of the location indicated in the first message.

In some embodiments the information communicated by the second message, e.g., the trust propagation message, includes second message source verification information, e.g., signature of the sender, message authentication code (MAC), and information for verifying that the information communicated by the first message has not been altered. It should be appreciated that source verification information such as a sender signature may help the first communications node to verify the authenticity of the second message and thus ensure that the second message is coming from a trusted source. In some embodiments the second message also includes a rating level indicator indicating one of a plurality of possible rating levels. For example, there may be two, three or even more different rating levels. In some embodiments the rating level indicator may indicate one of a trustworthiness rating, a service cost rating, and a quality rating. A higher trustworthiness rating, for example, means that the peer offering the service can be trusted. Thus, by way of a rating level, the trusted third communications node that is responding to the trust confirmation request, may express its approval, disapproval and/or some other opinion regarding the second communications node's offer of service.

Operation proceeds from step 508 to step 510. In step 510, first communications node determines, based on the information communicated by the second message, whether or not the information communicated by the first message is trustworthy. For example, the third communications node may have dealt with the second communications node earlier or have had used some service offered by second communications node. Based on the past experience, third communications node may categorize the second node, e.g., as trustworthy or non trustworthy. In some embodiments, third communications node B 104 may have a trust relationship with the second node e.g., based on a past experience of dealing with each other. Thus, third communications node may indicate trustworthiness of the second node in the second message, e.g., by way of the rating level indicator. In some embodiments, the second message also includes the information for verifying that the information communicated by the first message has not changed. Thus, we see that the second message includes information to assist the first communications node in determining the trustworthiness of the second communications node and integrity of the first message. However, it should be appreciated that second message alone may not be sufficient for the first communications node to decide on trustworthiness of the second communications node. For example, in some embodiments the first communications node may determine the trustworthiness of the information in the first message when it receives, e.g., a high trustworthiness rating of the second communications node, from a predetermined number, e.g., five, of the first communications node's trusted buddies. Other criteria to determine the trustworthiness of the information in the first message are used in some embodiments, e.g., a trustworthiness value is calculated as a function of trustworthiness information received from first communications device's trusted buddies, and the trustworthiness value is compared to a pass/fail limit. In some such embodiments, the first communications device may weigh information from different trusted buddies differently.

If it is determined that the information communicated by the first message is trustworthy, then operation proceeds from step 510 to step 512 wherein first communications node sends a response message to the second communications node in response to the first message. In some embodiments, the third communications node has a trust relationship with the second node. In some such embodiments the response message being sent from the first communications node in response to the first message, is sent through the third communications node. Because of the routing of the response message through the third node, the second node may trust the response message and its contents. The operation proceeds from step 512 back to step 504. On the other hand when it is determined that the information communicated by the first message cannot be trusted, operation proceeds from step 510 to step 514. In step 514, the first communications node refrains from transmitting the response message in response to the received first message. The operation proceeds from step 514 back to step 504.

In one exemplary embodiment, consider the flowchart of FIG. 5 in the context of the example of FIG. 2. The (first communications node, second communications node, third communications node) of FIG. 5 are (node C 106, node A 102, node B 104) of FIG. 2, respectively. The (first message, trust confirmation request message of step 506, second message, response message) of FIG. 5 are (MSG 1 203, request message 216, MSG 3 222, response 1 227), respectively.

In another exemplary embodiment, consider the flowchart of FIG. 5 in the context of the example of FIG. 3. The (first communications node, second communications node, third communications node) of FIG. 5 are (node C 106, node A 102, node B 104) of FIG. 3, respectively. The (first message, trust confirmation request message of step 506, second message, response message) of FIG. 5 are (MSG 1 303, request (1) message 316, MSG 3 322, response 1 327), respectively.

In yet another exemplary embodiment, consider the flowchart of FIG. 5 in the context of the example of FIG. 4. The (first communications node, second communications node, third communications node) of FIG. 5 are (node C 106, node A 102, node E 110) of FIG. 4, respectively. The (first message, trust confirmation request message of step 507, second message, response message) of FIG. 5 are (MSG 1 403, request (1) message 416, message 429, response 1 433), respectively.

Figure 6:
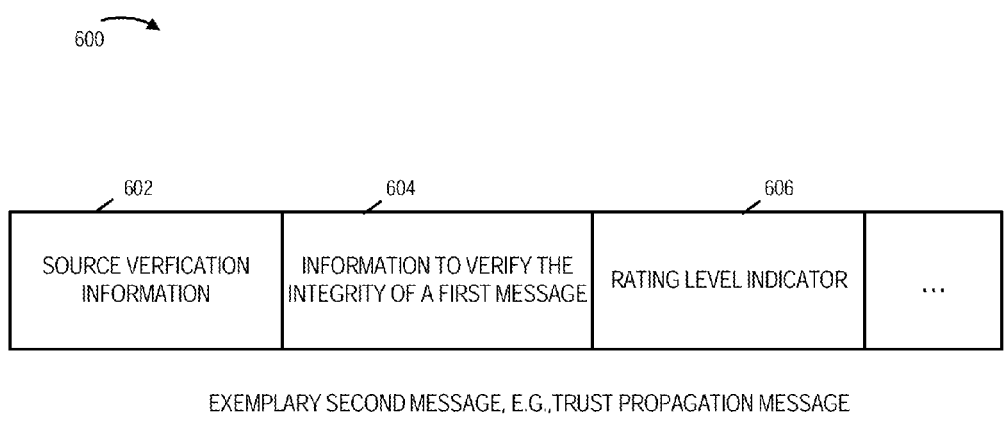
FIG. 6 illustrates an exemplary message format for an exemplary second message, e.g., a trust propagation message, in accordance with one exemplary embodiment.

FIG. 6 illustrates an exemplary message format for an exemplary second message 600, e.g., a trust propagation message, in accordance with one embodiment. The exemplary second message 600 shown in FIG. 6 may be used, e.g., as message MSG 3 222 of FIG. 2, message MSG 3 322 of FIG. 3, message MSG 3 422 of FIG. 4, or the second message discussed in the FIG. 5 flowchart. As shown in FIG. 6 the exemplary second message 600 include three fields. Field 602 includes the second message source verification information. In some embodiments the source verification information may be, for example, a signature of the node sending the second message 600. In some embodiments the source verification information may be, a message authentication code (MAC). In some embodiments, the source verification information includes both a signature and a MAC. The second field 604 of the exemplary second message 600 includes the information to verify the integrity of a first message. The first message is, e.g., MSG 1 203 of FIG. 1, MSG 1 303 of FIG. 3, MSG 1 403 of FIG. 4, or the first message of step 504 of flowchart 500 of FIG. 5. Thus, field 604 includes information for verifying that the information communicated by the first message has not been altered. The third field 606 of the exemplary second message 600, is a rating level indicator indicating one of a plurality, e.g., two, three or more, of possible rating levels. The rating level indicator indicates, in some embodiments, one of a trustworthiness rating, a service cost rating or a quality rating.

Figure 7:
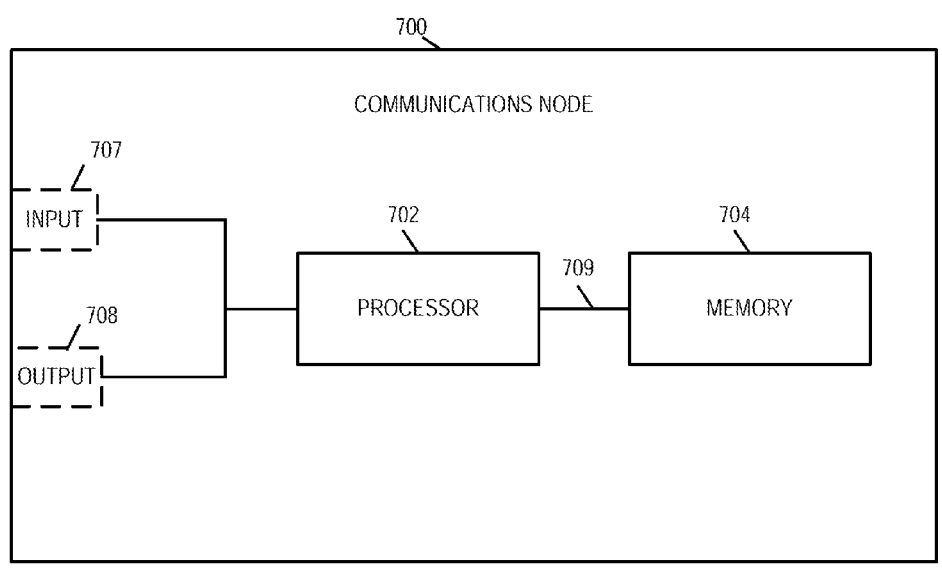
FIG. 7 illustrates an exemplary communications node which can be used in the network of FIG. 1.

FIG. 7 illustrates an exemplary communications node 700, which can be used as, e.g., the communication node C 106, shown in the communications network of FIG. 1, FIG. 2, FIG. 3 or FIG. 4. Communications node 700 may be, and in at least one embodiment is, a mobile wireless terminal supporting peer to peer communications and implementing a method in accordance with flowchart 500 of FIG. 5. Communications node 700 includes a processor 702 and memory 704 coupled together via a bus 709 over which the various elements (702, 704) may interchange data and information. Communications node 700 further includes an input module 706 and an output module 708 which may be coupled to the processor 702 as shown. However, in some embodiments the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output. Processor 702 is configured to: receive a first message from a second node said first message communicating information, receive a second message from a third node with which there is a trust relationship, and determine the trustworthiness of the information communicated by the first message based on information communicated by the second message.

In one exemplary embodiment, the first message is message MSG 1 203, e.g., a service offer message, the second node is node A 102, the second message is MSG 3 222, and the third node is node B 104. In another exemplary embodiment, the first message is message MSG 1 303, e.g., a service offer message, the second node is node A 102, the second message is MSG 3 322, and the third node is node B 104. In yet another exemplary embodiment, the first message is message MSG 1 403, e.g., a service offer message, the second node is node A 102, the second message is message 429, and the third node is node E 110.

In some embodiments, the communications node 700 does not have a pre-existing relationship with the second node. In some embodiments the processor 702 is further configured to communicate a trust confirmation request message to one or more trusted nodes following receipt of the first message, the third node being one of said one or more trusted nodes. In at least one embodiment the second message is in response to said trust confirmation request message. In some embodiments the processor 702 is further configured to send the trust confirmation request message to one or more trusted nodes for propagation to a node having a trust relationship with the second node, e.g., node A 102. In some embodiments, the processor 702 is further configured to send a response message to the second node after determining that the information communicated in the first message is trustworthy. In at least some embodiments the processor 702 is further configured to send the response message to the second node through the third node.

Figure 8:
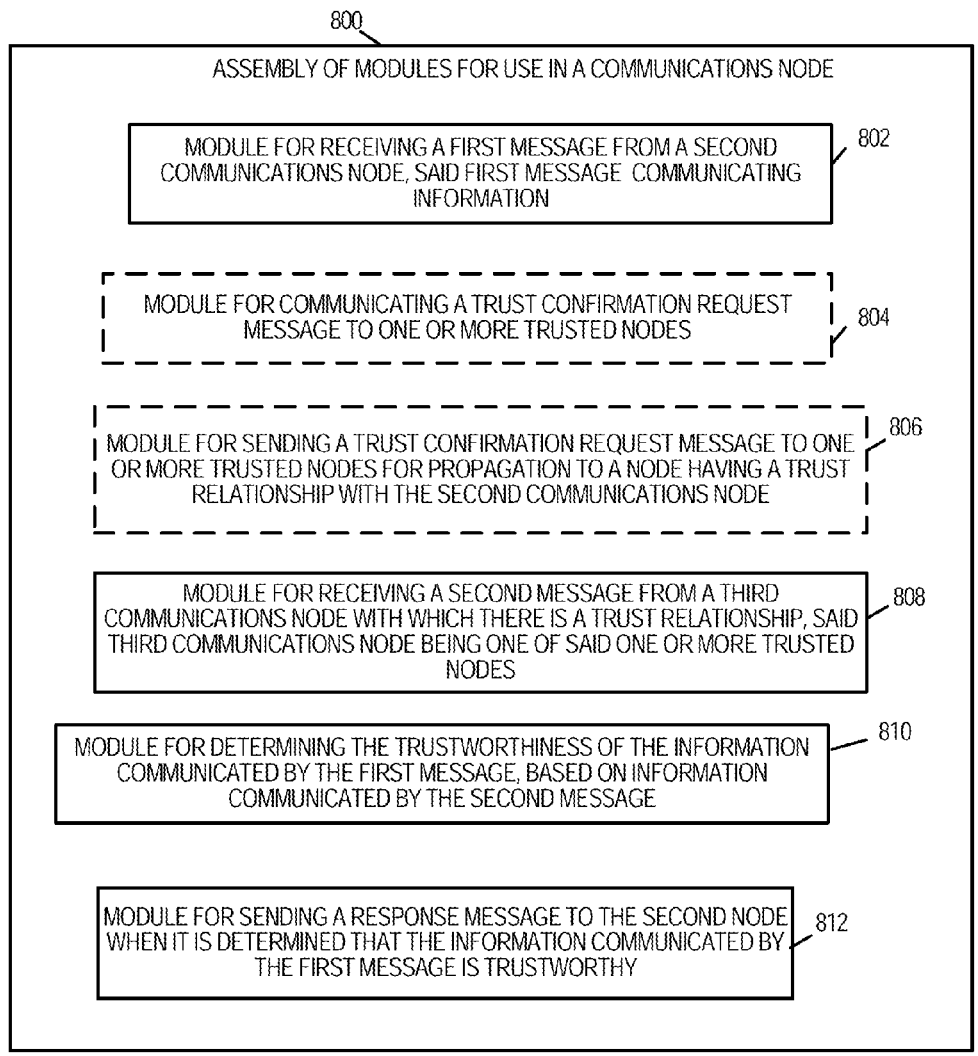
FIG. 8 illustrates an assembly of modules which can be used in the exemplary communications node of FIG. 7.

FIG. 8 is an assembly of modules 800 which can, and in some embodiments are, used in the communications node illustrated in FIG. 7, e.g., a first node. The modules in the assembly 800 can be implemented in hardware within the processor 702 of FIG. 7, e.g., as individual circuits. Alternatively, the modules may be implemented in software and stored in the memory 704 of the communications node 700 shown in FIG. 7. While shown in the FIG. 7 embodiment as a single processor, e.g., computer, it should be appreciated that the processor 702 may be implemented as one or more processors, e.g., computers.

When implemented in software the modules include code, which when executed by the processor 702, configure the processor to implement the function corresponding to the module. In embodiments where the assembly of modules 800 is stored in the memory 704, the memory 704 is a computer program product comprising a computer readable medium comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the communications node 700 or elements therein such as the processor 702, to perform the functions of the corresponding steps illustrated in the method flowchart of FIG. 5.

As illustrated in FIG. 8, the assembly of modules 800 includes a module 802 for receiving a first message from a second communications node, said first message communicating information, a module 804 for communicating a trust confirmation request message to one or more trusted nodes, a module 806 for sending a trust confirmation request message to one or more trusted nodes for propagation to a node having a trust relationship with the second communications node, and a module 808 for receiving a second message from a third communications node with which there is a trust relationship, said third communications node being one of said one or more trusted nodes. The modules 804 and 806 are optional. One or more of optional modules 804 and 806 are present in some embodiments, while in some other embodiments modules 804 and 806 are omitted. The assembly of modules 800 further includes a module 810 for determining the trustworthiness of the information communicated by the first message based on information communicated in the second message, and a module 812 for sending a response message to the second communications node after determining that the information communicated by the first message is trustworthy. In some embodiments the information communicated by the second message includes second message source verification information, e.g., signature, message authentication code, and/or other information for verifying that the information communicated by the first message has not been altered. In some embodiments the information communicated in the second message further includes a rating level indicator indicating one of a plurality of possible rating levels. In some such embodiments the rating level indicator indicates one of a trustworthiness rating, a service cost rating, or a quality rating. In some embodiments the first node using the assembly of modules 800 does not have a preexisting trust relationship with the second node. In some embodiments the first message includes at least one of a service offer, service request, advertisement, and media content. In some embodiments the first message further includes location information. In some embodiments the location information is GPS based location information.

Figure 9:
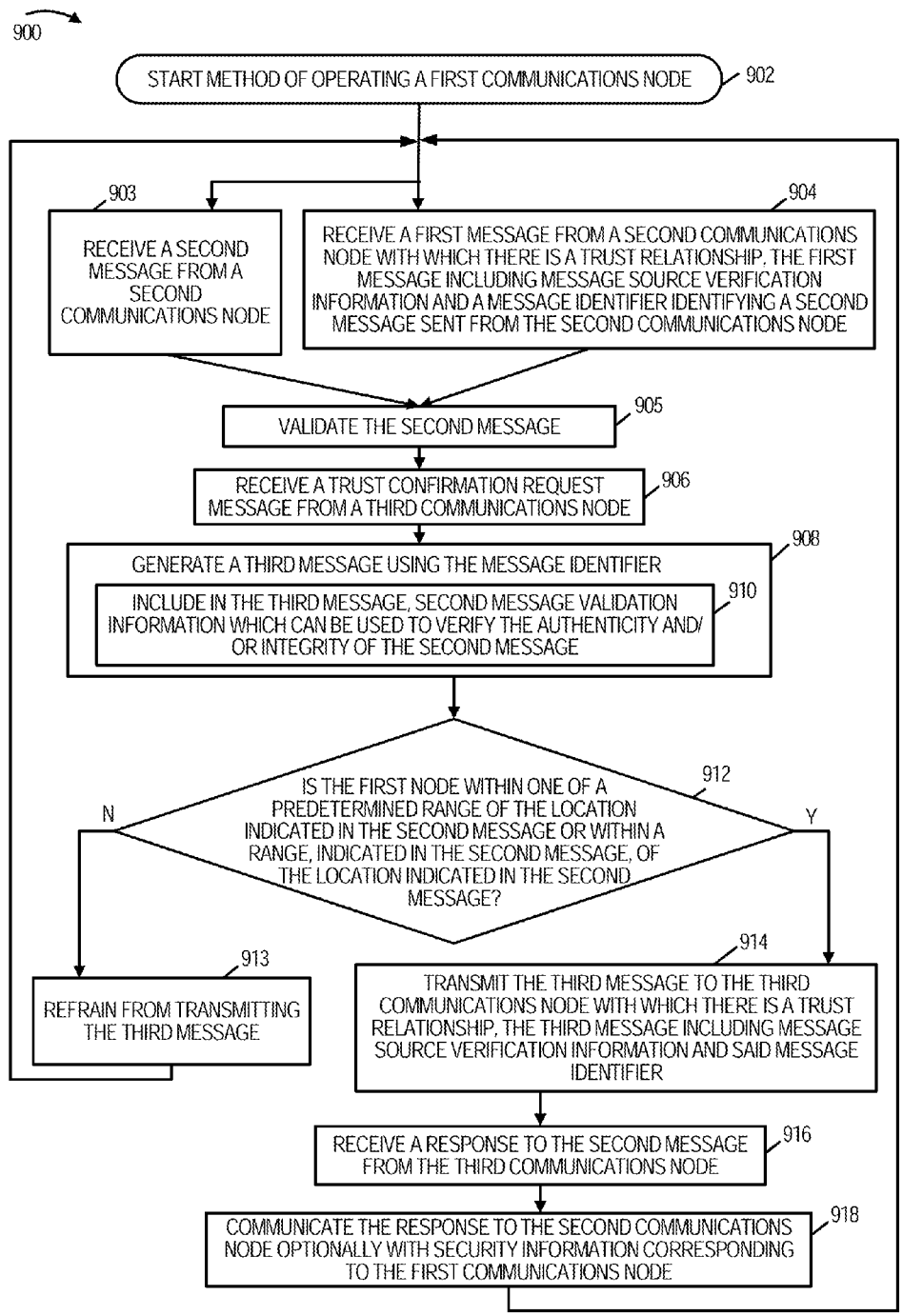
FIG. 9 is a flowchart of an exemplary communications method in accordance with one exemplary embodiment.

FIG. 9 is a flowchart 900 of an exemplary method of operating a first communications node, e.g., peer to peer communications node B 104 of FIG. 1, in accordance with an exemplary embodiment. Operation of the exemplary method starts in step 902 where the first communications node is powered on and initialized. Operation proceeds from start step 902 to steps 903 and 904. It should be appreciated that steps 903 and 904 may, but need not be, performed in parallel and independently.

In step 903 the first communications node receives a second message from a second communications node, e.g., node A 102. In various embodiments, the second message includes at least one of a service offer, service request, advertisement and media content. In one example, the second message is, e.g., a service offer message. In some embodiments the second message includes location information. In some such embodiments the location information is global positioning system (GPS) based location information. For example, in the case where the second message is a service offer message and the service being offered is, e.g., a car ride, the location information in the service offer message may be the location of an area from where the sender of service offer message would like to pick-up interested parties. Alternatively, the location information could be some other location, e.g., an area where the sender of the service offer message is currently located. Operation proceeds from step 903 to step 905.

Returning to step 904, in step 904 the first communications node receives a first message, e.g., trust build-up message, from the second communications node, the first message including message source verification information and a message identifier identifying the second message sent from the second communications node. The first communications node has a trust relationship with the second communications node. The second message is the message received in step 903. The message identifier is, e.g., hash or a unique identifier that can be used to identify the second message. Thus in accordance with an exemplary embodiment, the first message includes information to validate the second message sent from the second communications node. The operation proceeds from step 904 to 905.

In step 905 the first communications node validates the second message. The first node uses information, e.g., hash or other unique identifier, communicated by the first message, along with other relevant information included in the second message to check the validity of the second message. In some embodiments the second message includes, e.g., hash generated from the first message and a nonce. In some such embodiments, the first message may also include, the nonce carried in the second message. The first message may, and sometimes does, carry the signature of the sender. Thus, using the information communicated by the first message, and information included in the second message, the first communications node validates the second message. It should be appreciated that the first communications node performs the validation operation to verify and/or ensure, e.g., that the payload of the second message has not been altered. The operation proceeds from step 905 to 906.

In step 906 the first communications node receives a trust confirmation request message from a third communications node, e.g., node C 106, with which it has a trust relationship. The third communications node may be interested in using the offered service indicated in the second message and may send the trust confirmation request message to one or more of its trusted buddies to gather, e.g., trustworthiness information, regarding the second communications node. Since the first communications node is a trusted buddy of the third communications node, it receives the trust confirmation request message. In some embodiments, the trust confirmation request message includes the message identifier identifying the second message and at least one of a sender signature, e.g., node C 106 signature, or message authentication code. It should be appreciated that the trust confirmation request message may carry this information, for example, so that the first communications node receiving the trust confirmation request message may know that the trust confirmation request is made by a trusted buddy, and secondly so that the first communications node may identify the message and/or the sender regarding which third communications seeks the trustworthiness information. The operation proceeds from step 906 to step 908.

In step 908, the first communications node generates a third message, e.g., a trust propagation message, using the message identifier identifying the second message, which was included in the first message. The third message, in some embodiments, includes fields that are derived from or based on one or more fields in the first message. In some embodiments, as part of generating the third message in step 908, sub-step 910 is performed. In sub-step 910 second message validation information, e.g., a one way hash value and/or a key, which can be used to verify the authenticity and/or integrity of the second message, is included in the third message. Thus, in some embodiments, information for verifying that the contents of the second message have not been altered is included in the third message. This allows a node receiving the third message, to verify the authenticity and/or integrity of the second message.

Operation proceeds from step 908 to step 912 wherein a determination is made whether or not the first communications node is within one of a predetermined range of the location indicated in the second message or within a range, indicated in the second message, of the location indicated in the second message. The range may be, e.g., a value that the user of the second communications node may set prior to sending the second message. In the event, when in step 912 it is determined that the first communications node is not within one of: i) a predetermined range of the location indicated in the second message or ii) within a range, indicated in the second message, of the location indicated in the second message, then operation proceeds from step 912 to step 913 where the first communications node refrains from transmitting the third message. The operation proceeds from step 913 back to steps 903 and 904.

In some embodiments, when it is determined that the first communications node is within one of a predetermined range of the location indicated in the second message or within a range, indicated in the second message, of the location indicated in the second message, then operation proceeds from step 912 to step 914. In step 914, the first communications node transmits the generated third message to the third communications node, the third message including message source verification information and the message identifier identifying the second message. Note that there is a trust relationship between the third communications node and the first communications node. The source verification information is, for example, the signature of the first communications node transmitting the third message. In some embodiments, the third message is transmitted in response to the trust confirmation request message, received by the first communications node in step 906. It should be appreciated that since the third message is signed by the first communications node, this allows the third node to recognize that third message is coming from its trusted buddy. Secondly, since the unique identifier identifying the second message is included in the third message, this allows third communications node to verify that the information communicated in the second message is valid. The operation proceeds from step 914 to 916.

In step 916 the first communications node receives a response to the second message from the third communications node. In some embodiments, the third communications node sends the response after determining that the information communicated by the second message is trustworthy. The received response may be, for example, an indication and/or an acknowledgment that the third communications node is interested in using the service offered by the second communications node and would like to interact directly with the second communications node.

Operation proceeds from step 916 to step 918 wherein the first communications node communicates the received response to the second communications node. In some embodiments, the received response is communicated with security information corresponding to the first communications node, from the first communications node to the second communications node. Operation proceeds from step 918 to the inputs of steps 903 and 904.

In one exemplary embodiment where flowchart 900 is considered corresponding to the example of FIG. 2, the first communications node is node B 104, the second communications node is node A 102, the third communications node is node C 106, the second message is MSG 1 203, the first message is message MSG 2 210, the trust confirmation request message is message 216, the third message is message MSG 3 222, the received response is response 1 message 227, and the communicated response to the second communications node with optional security information is response 2 message 229.

In another exemplary embodiment where flowchart 900 is considered corresponding to the example of FIG. 3, the first communications node is node B 104, the second communications node is node A 102, the third communications node is node C 106, the second message is MSG 1 303, the first message is message MSG 2 310, the trust confirmation request message is message 316, the third message is message MSG 3 322, the received response is response 1 message 327, and the communicated response to the second communications node with optional security information is response 2 message 329.

In yet another exemplary embodiment where flowchart 900 is considered corresponding to the example of FIG. 4, the first communications node is node B 104, the second communications node is node A 102, the third communications node is node C 106, the second message is MSG 1 403, the first message is message MSG 2 410, the trust confirmation request message is message 416', the third message is message MSG 3 422, the received response is response 2 message 435, and the communicated response to the second communications node with optional security information is response 3 message 437.

Figure 10:
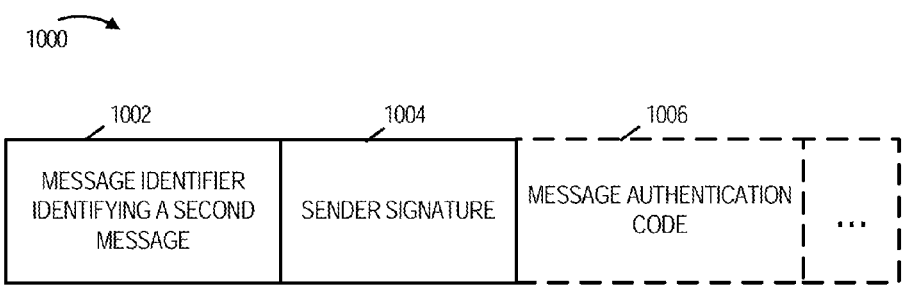
FIG. 10 illustrates an exemplary format of an exemplary request confirmation message.
Figure 11:
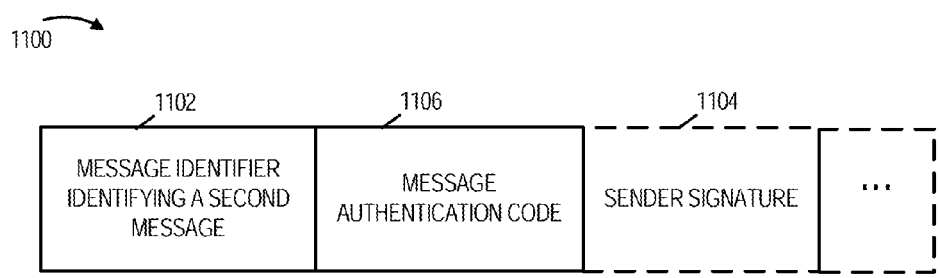
FIG. 11 illustrates another exemplary format of an exemplary request confirmation message.
Figure 12:
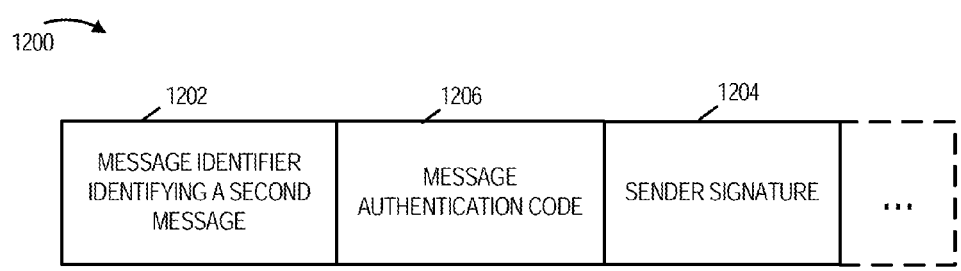
FIG. 12 illustrates yet another exemplary format of an exemplary request confirmation message.

FIGS. 10, 11 and 12 show different exemplary message formats of exemplary trust confirmation request messages. Formats described in FIGS. 10, 11 and 12 may be used for any of the exemplary trust confirmation request messages including message 216 of FIG. 2, message 316 of FIG. 3, message 316' of FIG. 3, or message 416 of FIG. 4 or message 416' of FIG. 4.

As discussed earlier, a communications node interested in, e.g., a service, offered by another user by way of, e.g., the service request message, may wish to gather sufficient credibility or trustworthiness information about the node sending the service offer message. In some examples we have discussed, node A 102 advertises a service offer message, and node C 106 may be interested in the offered service. Thus, following the receipt of service offer message, node C 106 sends a trust confirmation request message to one or more of its trusted peers. The trust confirmation request message may be, for example, a request to node C's trusted peers to confirm if the sender of the service offer message and the contents of the message can be trusted. There is a reasonable probability that in a geographic area, one or more nodes trusted by node C 106 may be aware of the reputation of node A 102, e.g., due to a past dealing with node A 102.

In some embodiments, even if a node trusted by node C 106 is not aware of the trustworthiness of node A 102, it may be able to help node C 106 by forwarding the trust confirmation request message to its own list of trusted nodes which may in turn pass on the message further. For example, in FIG. 4 node E 110 forwards received trust confirmation request message 416 as message 416' to node B 104.

In some particular examples discussed below with regards to FIGS. 10, 11 and 12 consider that node A 102 is the node advertising a service offer message, node C 106 is the node which is interested in the offered service, and node B 104 is a node that has a trust relationship with both node A 102 and node C 106.

FIG. 10 is a drawing that illustrates one exemplary format of a trust confirmation request message 1000. The exemplary trust confirmation request message 1000 includes a field 1002 for a message identifier identifying a second message, a field 1004 for a sender signature, and an optional field 1006 for a message authentication code.

For the purpose of explanation, consider that trust confirmation request message 1000 is message 216 of FIG. 2. The second message is, e.g. message MSG 1 203 of FIG. 2. Message identifier field 1002, among other things, may help the node receiving the trust confirmation request message 1000 identify which advertisement message/service offer message is being questioned or talked about, since it is possible that more than one advertisement message had been received by communications node B 104.

The sender signature 1004 may be, e.g., communications node C's 106 signature. The sender's signature helps the receiving node B 104 receiving trust confirmation request message 1000 determine that the trust confirmation request is being made by a trusted buddy. In some embodiments when trust confirmation request message 1000 is received from a non-trusted user, the node receiving such a request, e.g., node B 104, may simply decide not to reply and may ignore the request. The exemplary trust confirmation request message 1000 may further include an optional field 1006 for a message authentication code (MAC). The optional MAC field 1006 is shown using a box with dashed lines. The optional MAC field, if present, provides an extra level of protection for the trust confirmation request message's data integrity as well as authenticity.

FIG. 11 shows a drawing illustrating yet another exemplary format of the exemplary trust confirmation request message 1100. The exemplary trust confirmation request message 1100 includes a field 1102 for a message identifier identifying a second message, a field 1106 for a message authentication code, and an optional field 1104 for a sender signature. Field 1102 of FIG. 11 is the same or similar to field 1002 of FIG. 10; field 1106 of FIG. 11 is the same or similar to field 1006 of FIG. 10; field 1104 of FIG. 11 is the same or similar to field 1004 of FIG. 10. In this particular embodiment of FIG. 11, the sender signature field 1104 is optional, and thus may or may not be present.

FIG. 12 is a drawing 1200 that illustrates another exemplary format of a trust confirmation request message 1200. The exemplary trust confirmation request message 1200 includes a field 1202 for a message identifier identifying a second message, a field 1206 for a message authentication code, and a field 1204 for a sender signature. Field 1202 of FIG. 12 is the same or similar to field 1002 of FIG. 10; field 1206 of FIG. 12 is the same or similar to field 1006 of FIG. 10; field 1204 of FIG. 12 is the same or similar to field 1004 of FIG. 10. In the format used by trust confirmation request message 1200 each of the three fields 1202, 1206 and 1204 are normally included.

Figure 13:
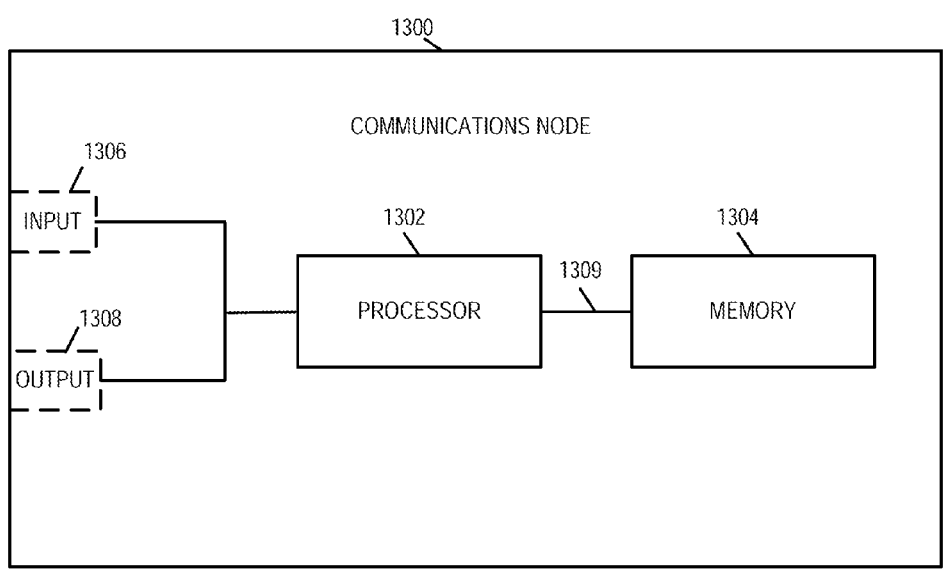
FIG. 13 illustrates another exemplary communications node which can be used in the network of FIG. 1.

FIG. 13 illustrates an exemplary communications node 1300, which can be used as, e.g., the communication node B 104, shown in the communications network of FIG. 1. Communications node 1300 may be, and in at least one embodiment is, a mobile wireless terminal supporting peer to peer communications and implementing a method in accordance with flowchart 900 of FIG. 9. Communications node 1300 includes a processor 1302 and memory 1304 coupled together via a bus 1309 over which the various elements (1302, 1304) may interchange data and information. Communications node 1300 further includes an input module 1306 and an output module 1308 which may be coupled to the processor 1302 as shown. However, in some embodiments the input module 1306 and output module 1308 are located internal to the processor 1302. Input module 1306 can receive input signals. Input module 1306 can, and in some embodiments does, include a wireless receiver and/or a wired or optical input interface for receiving input. Output module 1308 may, and in some embodiments does, include a wireless transmitter and/or a wired or optical output interface for transmitting output.

Processor 1302 is configured to: receive a first message from a second communications node, e.g., node A 102, with which there is a trust relationship, the first message including message source verification information and a message identifier identifying a second message sent from the second communications node, and transmit a third message to a third communications node with which there is a trust relationship, the third message including message source verification information and said message identifier. In some embodiments the second message includes location information. In some embodiments the processor 1302 is further configured to determine, prior to transmitting the third message, if the first node, i.e., communication node 1300, is within one of a predetermined range of the location indicated in the second message or within a range, indicated in the second message, of the location indicated in the second message. In some embodiments the processor is configured to refrain from transmitting the third message when it is determined that the first communications node 1300 is not within one of: i) a predetermined range of the location indicated in the second message or ii) within a range, indicated in the second message, of the location indicated in the second message.

In some embodiments the processor 1302 is further configured to receive the second message, e.g., prior to transmitting the third message, validate the second message, and generate the third message using said identifier. In some embodiments, in generating the third message, the processor 1302 is further configured to include in said third message, the second message validation information, e.g., a one way hash value or key, which can be used to verify the authenticity and/or integrity of the second message.

Processor 1302, in some embodiments, is further configured to receive a trust confirmation request message, from the third communications node, prior to transmitting the third message. In some embodiments, the processor 1302 is configured to transmit the third message in response to said trust confirmation request message. In some embodiments the trust confirmation request message includes said message identifier, and at least one of a sender signature or message authentication code (MAC). In some embodiments the processor 1302 is further configured to receive a response, to the second message from the third communications node, and communicate the response to the second communications node. In some embodiments the processor 1302 is further configured to communicate the response to the second communications node, optionally with security information corresponding to the first communications node 1300.

In one exemplary embodiment corresponding to the example of FIG. 2, the first communications node 1300 is node B 104, the second communications node is node A 102, the third communications node is node C 106, the second message is MSG 1 203, the first message is message MSG 2 210, the trust confirmation request message is message 216, the third message is message MSG 3 222, the received response is response 1 message 227, and the communicated response to the second communications node with optional security information is response 2 message 229.

In another exemplary embodiment corresponding to the example of FIG. 3, the first communications node 1300 is node B 104, the second communications node is node A 102, the third communications node is node C 106, the second message is MSG 1 303, the first message is message MSG 2 310, the trust confirmation request message is message 316, the third message is message MSG 3 322, the received response is response 1 message 327, and the communicated response to the second communications node with optional security information is response 2 message 329.

In yet another exemplary embodiment corresponding to the example of FIG. 4, the first communications node 1300 is node B 104, the second communications node is node A 102, the third communications node is node C 106, the second message is MSG 1 403, the first message is message MSG 2 410, the trust confirmation request message is message 416', the third message is message MSG 3 422, the received response is response 2 message 435, and the communicated response to the second communications node with optional security information is response 3 message 437.

Figure 14:
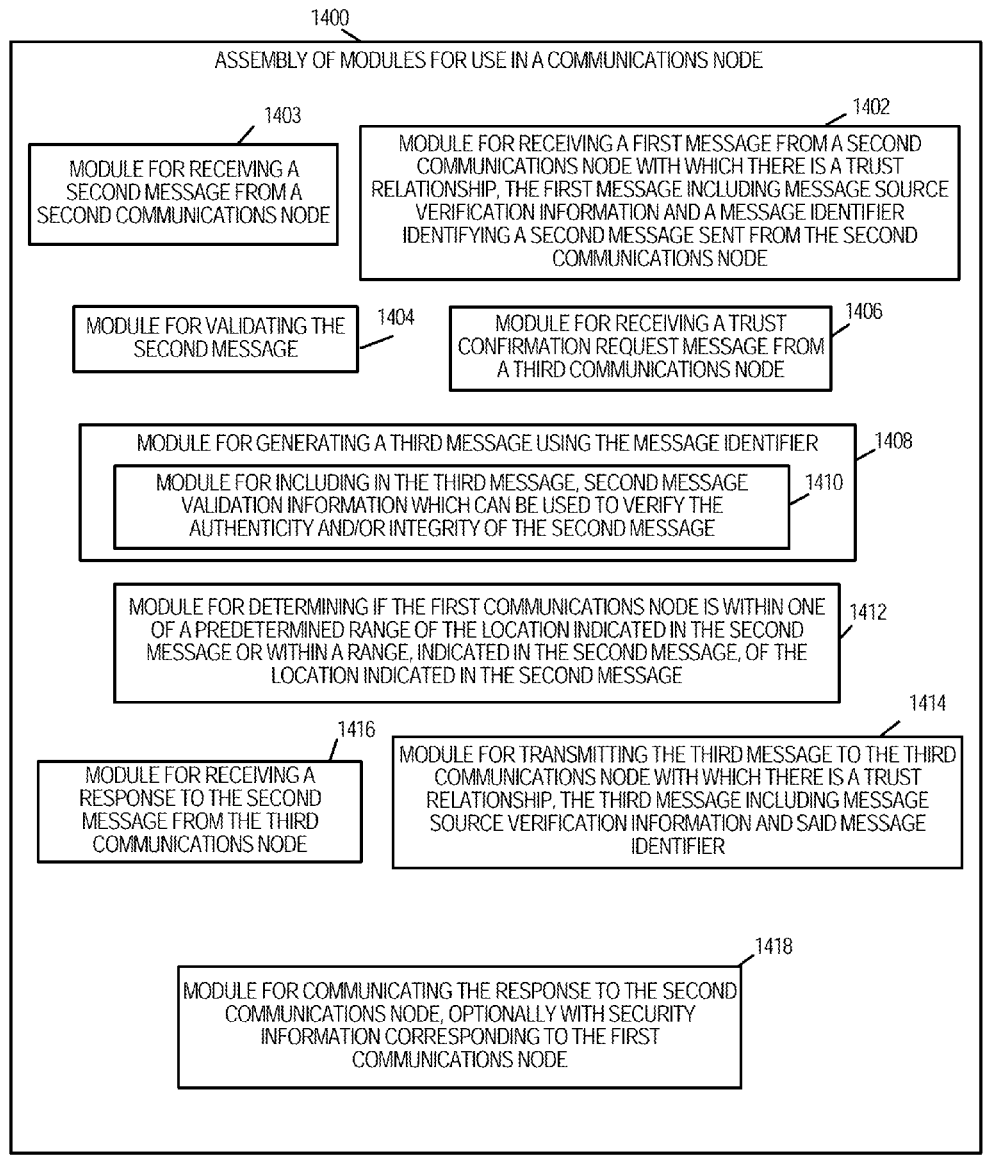
FIG. 14 illustrates an assembly of modules which can be used in the exemplary communications node of FIG. 13.

FIG. 14 is an assembly of modules 1400 which can, and in some embodiments are, used in the communications node illustrated in FIG. 13, e.g., a first communications node. The modules in the assembly 1400 can be implemented in hardware within the processor 1302 of FIG. 13, e.g., as individual circuits. Alternatively, the modules may be implemented in software and stored in the memory 1304 of the communications node 1300 shown in FIG. 13. While shown in the FIG. 13 embodiment as a single processor, e.g., computer, it should be appreciated that the processor 1302 may be implemented as one or more processors, e.g., computers.

When implemented in software the modules include code, which when executed by the processor 1302, configure the processor to implement the function corresponding to the module. In embodiments where the assembly of modules 1400 is stored in the memory 1304, the memory 1304 is a computer program product comprising a computer readable medium comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the communications node 1300 or elements therein such as the processor 1302, to perform the functions of the corresponding steps illustrated in the method flowchart of FIG. 9.

As illustrated in FIG. 14, the assembly of modules 1400 includes a module 1402 for receiving a first message from a second communications node with which there is a trust relationship, the first message including message source verification information and a message identifier identifying a second message sent from the second communications node, a module 1403 for receiving the second message from the second communications node, a module 1404 for validating the second message, a module 1406 for receiving a trust confirmation request message from a third communications node. In some embodiments the assembly of modules 1400 further includes a module 1408 for generating the third message using the message identifier. The message identifier is the message identifier received in the first message. In some such embodiments, module 1408 includes a module 1410 for including in the third message, second message validation information which can be used to verify the authenticity and/or integrity of the second message.

In some embodiments the second message includes location information. In some embodiments the assembly of modules 1400 further includes a module 1412 for determining if the first communications node, e.g., node 1300 that uses the assembly of modules 1400, is within one of a predetermined range of the location indicated in the second message or within a range, indicated in the second message, of the location indicated in the second message. The assembly of modules 1400 further includes a module 1414 for transmitting the third message to the third communications node with which there is a trust relationship, the third message including message source verification information and said message identifier, a module 1416 for receiving a response to the second message from the third communications node, and a module 1418 for communicating the response to the second communications node, optionally with security information corresponding to the first node 1300 using the assembly of modules 1400.

Methods and apparatus for wireless communications in networks, e.g., regional ad hoc peer to peer networks, are described. Among the described methods and apparatus are methods and apparatus for communicating information and building trust between various communications devices, e.g., nodes, which support peer to peer signaling.

In one exemplary embodiment, a user in an ad hoc network is able to transmit, e.g., multicast, different types of messages, e.g., advertisements, request, news, etc., to other users located within the range of his/her device. Receiving users, who have never dealt with the sender before, would normally have no way to determine whether or not the sender could be trusted and whether or not it is worthwhile to spend time to reply to the sender's message. Note that such a lack of trust is independent from being able to validate the signature carried by the message. In fact, a malicious user can sign and transmit, e.g., multicast, the message and the receivers may be able to validate the signature but this does not mean that the sender is sincere about his/her intention. For example, a malicious user can sign and transmit, e.g., multicast, the message "Who's interested in a free ride to Manhattan in one hour?", but the malicious sender may never show up to perform the offered service. Consequently, under such a scenario, a victim may end up wasting his or her time waiting for the promised ride. Similar trust issue considerations can be problematic from the sender's perspective. For example, while the sender may be willing to give a free ride to Manhattan, e.g., in order to gain the benefits associated with a car pool lane and/or reduced toll, he or she may not receive any guests. For example, potential guests receiving the message including the offer may not have an existing trust relationship with the person offering the ride and may ignore the offer, e.g., out of safety concerns, dependability concerns, and/or offer sincerity concerns.

Various novel methods and apparatus facilitate a receiver of a message from a sender with which the receiver does not have an existing trust relationship to determine whether or not the sender can be trusted and/or whether or not it is worthwhile to reply to the sender's message. New methods and apparatus allow peer devices operating in a geographic region to gather credibility information about each other and build-up trust. In some, but not necessarily all embodiments, an individual device may maintain a list of its trusted peers. Different devices may have different lists of trusted peers. There can be, and generally is, some overlap between at least some of the different lists. The overlap is useful in propagating trust information. A device's maintained trust information can later on be propagated to other users, e.g., facilitating a trustworthiness determination regarding information in a received message from a sender with which the receiver does not have a current trust relationship.

Various methods and apparatus are beneficial to encouraging users to launch new types of social real time applications which may rely on peer-to-peer connections and/or are beneficial in implementing social real time applications using peer-to peer connections. An advantage of at least some of the exemplary novel described methods and apparatus for providing trust between different users relates to their scalability. Due to their adhoc nature, peer-to-peer connections in a certain area can have a very random size which can also vary at high speed. To successfully adapt to these variations, the performance of a successful solution should ideally increase with the number of users. In various described exemplary embodiments, performance increases with the number of users. Another concern can be how to protect the user's privacy. Sometimes when sending a message, e.g., a request, the sender may not desire to disclose its true identity in the message. Various described embodiments, allow a sender to protect its privacy while still allowing a receiver to gather trust information regarding the sender. In some embodiments, the receiver may be allowed to discover the sender's real identity subsequently, e.g. when negotiating directly with him/her.

From the above discussion it should be appreciated that numerous variations and embodiments are possible.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, stationary nodes, base stations, relay stations, relay nodes, and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. Various features are directed to novel messages and/or the use of novel messages. The messages are generated, stored and/or communicated. As part of the communications processes one or more of the messages are stored prior to transmission and stored upon receipt. Thus, some features are directed to a memory device, e.g., computer readable medium, having stored thereon one or more of the messages described in the present application. In many cases the messages provide efficiency in terms of their data structure and/or other benefits, over other message formats which might be used, such as the ability to easily identify and access some information in the message.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation, determination, and/or transmission steps, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method, comprising:
operating a first communications node including a processor to receive a first message comprising a multicast message from a second communications node, said first message communicating information;
operating the first communications node to receive a second message from a third communications node with which there is a trust relationship, wherein the third communications node is within a particular range of a location indicated by the first message, the second message including message source verification information and information for verifying that the information communicated by the first message comprising the multicast message has not been altered; and
operating the first communications node to determine the trustworthiness of the information communicated by the first message based on information communicated by the second message.

2. The method of claim 1, wherein the information for verifying that the information communicated by the first message has not been altered is one of a one way hash value or a key, which can be used to verify the integrity of the first message.

3. The method of claim 2,
wherein the message source verification is a message authentication code; and
wherein the information communicated by the second message further includes a rating level indicator indicating one of a plurality of possible rating levels.

4. The method of claim 1, further comprising:
communicating a trust confirmation request message to one or more trusted nodes following receipt of said first message, said third communications node being one of said one or more trusted nodes.

5. The method of claim 4, wherein said second message is in response to said trust confirmation request message.

6. The method of claim 1, further comprising:
after determining that the information communicated by the first message is trustworthy, sending a response message to the second communications node.

7. The method of claim 1, wherein said third communications node is a communications node which received said first message comprising the multicast message from the second communications node.

8. The method of claim 1, wherein said information for verifying that the information communicated by the first message has not been altered includes information that was received by said third node from the second node.

9. A first communications node comprising:
means for receiving a first message comprising a multicast message from a second communications node, said first message communicating information;
means for receiving a second message from a third communications node with which there is a trust relationship, wherein the third communications node is within a particular range of a location indicated by the first message, the second message including message source verification information and information for verifying that the information communicated by the first message comprising the multicast message has not been altered; and
means for determining the trustworthiness of the information communicated by the first message based on information communicated by the second message.

10. The first communications node of claim 9, wherein the information for verifying that the information communicated by the first message has not been altered is one of a one way hash value or a key, which can be used to verify the integrity of the first message.

11. The first communications node of claim 10, wherein the information communicated by the second message further includes a rating level indicator indicating one of a plurality of possible rating levels.

12. The first communications node of claim 9, further comprising:
means for communicating a trust confirmation request message to one or more trusted nodes following receipt of said first message, said third communications node being one of said one or more trusted nodes.

13. A computer program product for use in a first communications node, comprising:
a non-transitory computer readable medium comprising:
code for causing at least one computer to receive a first message comprising a multicast message from a second communications node, said first message communicating information;
code for causing the at least one computer to receive a second message from a third communications node with which there is a trust relationship, wherein the third communications node is within a particular range of a location indicated by the first message, the second message including message source verification information and information for verifying that the information communicated by the first message comprising the multicast message has not been altered; and
code for causing the at least one computer to determine the trustworthiness of the information communicated by the first message based on information communicated by the second message.

14. A first communications node comprising:
at least one processor configured to:
receive a first message comprising a multicast message from a second communications node, said first message communicating information;
receive a second message from a third communications node with which there is a trust relationship, wherein the third communications node is within a particular range of a location indicated by the first message, the second message including message source verification information and information for verifying that the information communicated by the first message comprising a multicast message has not been altered; and
determine the trustworthiness of the information communicated by the first message based on information communicated by the second message; and
a memory coupled to said at least one processor.

15. The first communications node of claim 14, wherein the information for verifying that the information communicated by the first message has not been altered is one of a one way hash value or a key, which can be used to verify the integrity of the first message.

16. The first communications node of claim 14, wherein the at least one processor is further configured to:
communicate a trust confirmation request message to one or more trusted nodes following receipt of said first message, said third communications node being one of said one or more trusted nodes.

17. The first communications node of claim 14, wherein the at least one processor is further configured to:

send a response message to the second communications node after determining that the information communicated by the first message is trustworthy.

18. A method, comprising:
operating a first communications node including a processor to receive a first message from a second communications node with which there is a trust relationship, the first message including message source verification information and a message identifier identifying a second message comprising a multicast message sent from the second communications node;
receiving the second message;
operating the first communications node to determine if the first communications node is within a particular range of a location indicated by the second message; and
in response to determining that the first communications node is within the particular range of the location indicated by the second message, operating the first communications node to transmit a third message to a third communications node with which there is a trust relationship, the third message including message source verification information and said message identifier.

19. The method of claim 18, further comprising:
validating said second message; and
generating said third message using said message identifier.

20. The method of claim 18, further comprising:
receiving a trust confirmation request message from the third communications node prior to said transmitting, said third message being transmitted in response to said trust confirmation request message.

21. The method of claim 20, wherein said trust confirmation request message includes said message identifier and at least one of a sender signature or a message authentication code.

22. The method of claim 20, further comprising:
receiving a response to said second message from the third communications node; and
communicating the response to the second communications node.

23. The method of claim 22, wherein said communicating the response to the second communications node comprises communicating the response with security information corresponding to the first communications node.

24. A first communications node comprising:
means for receiving a first message from a second communications node with which there is a trust relationship, the first message including message source verification information and a message identifier identifying a second message comprising a multicast message sent from the second communications node;
means for receiving the second message;
means for determining if the first communications node is within a particular range of a location indicated by the second message; and
means for, in response to the means for determining determining that the first communications node is within the particular range of the location indicated by the second message, transmitting a third message to a third communications node with which there is a trust relationship, the third message including message source verification information and said message identifier.

25. The first communications node of claim 24, further comprising:
means for validating said second message; and
means for generating said third message using said message identifier.

26. The first communications node of claim 24, further comprising:
means for receiving a trust confirmation request message from the third communications node prior to said transmitting, said third message being transmitted in response to said trust confirmation request message.

27. The first communications node of claim 26, wherein said trust confirmation request message includes said message identifier and at least one of a sender signature or a message authentication code.

28. A computer program product for use in a first communications node, comprising:
a non-transitory computer readable medium comprising:
code for causing at least one computer to receive a first message from a second communications node with which there is a trust relationship, the first message including message source verification information and a message identifier identifying a second message comprising a multicast message sent from the second communications node;
code for causing the at least one computer to receive the second message;
code for causing the at least one computer to determine if the first communications node is within a particular range of a location indicated by the second message; and
code for, in response to determining that the first communications node is within the particular range of the location indicated by the second message, causing the at least one computer to transmit a third message to a third communications node with which there is a trust relationship, the third message including message source verification information and said message identifier.

29. A first communications node comprising:
at least one processor configured to:
receive a first message from a second communications node with which there is a trust relationship, the first message including message source verification information and a message identifier identifying a second message comprising a multicast message sent from the second communications node;
receive the second message;
determine if the first communications node is within a particular range of a location indicated by the second message; and
in response to determining that the first communications node is within the particular range of the location indicated by the second message, transmit a third message to a third communications node with which there is a trust relationship, the third message including message source verification information and said message identifier; and
a memory coupled to said at least one processor.

30. The first communications node of claim 29, wherein the at least one processor is further configured to:
validate said second message; and
generate said third message using said message identifier.

31. The first communications node of claim 29, wherein the at least one processor is further configured to:
receive a trust confirmation request message from the third communications node prior to said transmitting, said third message being transmitted in response to said trust confirmation request message.

32. The first communications node of claim 31, wherein the at least one processor is further configured to:
receive a response to said second message from the third communications node; and
communicate the response to the second communications node.

* * * * *